United States Patent
Mihara

Patent Number: 4,487,484
Date of Patent: Dec. 11, 1984

[54] BEHIND-STOP TESSER TYPE LENS SYSTEM

[75] Inventor: Shin-ichi Mihara, Hachiouji, Japan

[73] Assignee: Olympus Optical Co., Ltd., Tokyo, Japan

[21] Appl. No.: 532,150

[22] Filed: Sep. 14, 1983

[30] Foreign Application Priority Data

Sep. 16, 1982 [JP] Japan ................... 57-161466
Jan. 26, 1983 [JP] Japan ................... 58-11075

[51] Int. Cl.$^3$ ................................ G02B 9/20
[52] U.S. Cl. ........................ 350/449; 350/476
[58] Field of Search .............. 350/449, 475, 476

[56] References Cited

U.S. PATENT DOCUMENTS

| | | | |
|---|---|---|---|
| 2,724,992 | 11/1955 | Brendel et al. | 350/476 |
| 3,420,602 | 1/1969 | Eggert et al. | 350/476 |
| 3,615,126 | 10/1971 | Kojima | 350/476 |
| 3,895,857 | 7/1975 | Imai | 350/476 |
| 4,213,674 | 7/1980 | Momiyama | 350/476 |
| 4,281,908 | 8/1981 | Yamaguchi | 350/476 |

FOREIGN PATENT DOCUMENTS 5022630  3/1975  Japan.
5329103  8/1978  Japan.
5559418  5/1980  Japan.

*Primary Examiner*—John K. Corbin
*Assistant Examiner*—Scott J. Sugarman
*Attorney, Agent, or Firm*—Cushman, Darby & Cushman

[57] ABSTRACT

A behind-stop Tesser type lens system comprising a first lens component of a positive meniscus lens of which a convex surface is faced to the object-side, a second lens component of biconcave lens, and a third lens component of a cemented doublet comprising a negative meniscus lens and a biconvex lens and so arranged as to be compact and provided with a favorable image forming ability.

2 Claims, 9 Drawing Figures

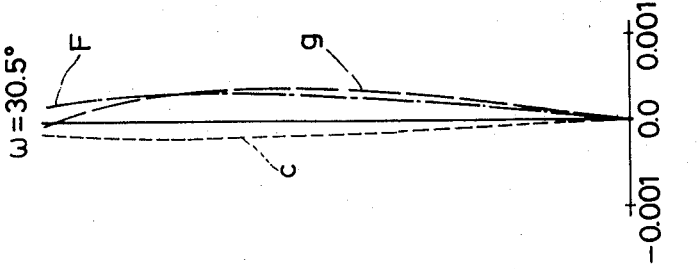
FIG. 2A SPHERICAL ABERRATION
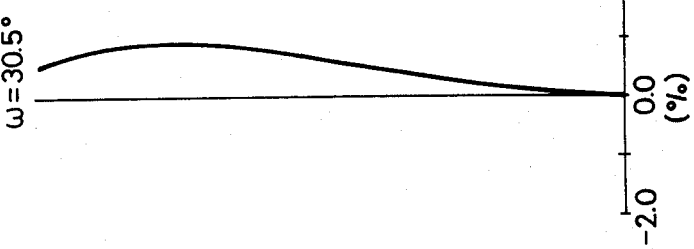
FIG. 2B ASTIGMATISM
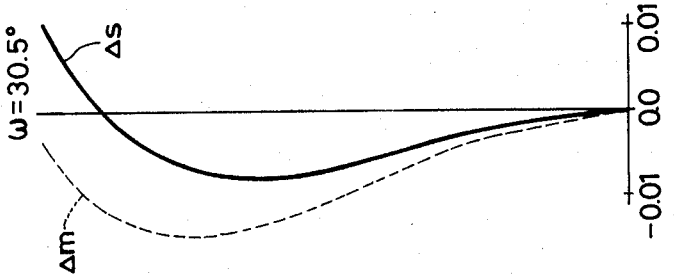
FIG. 2C DISTORTION
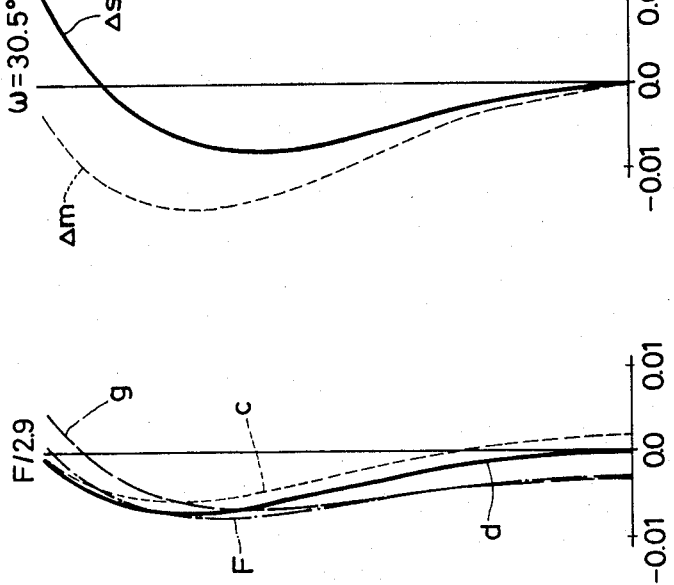
FIG. 2D DISTORTION OF MAGNIFICATION

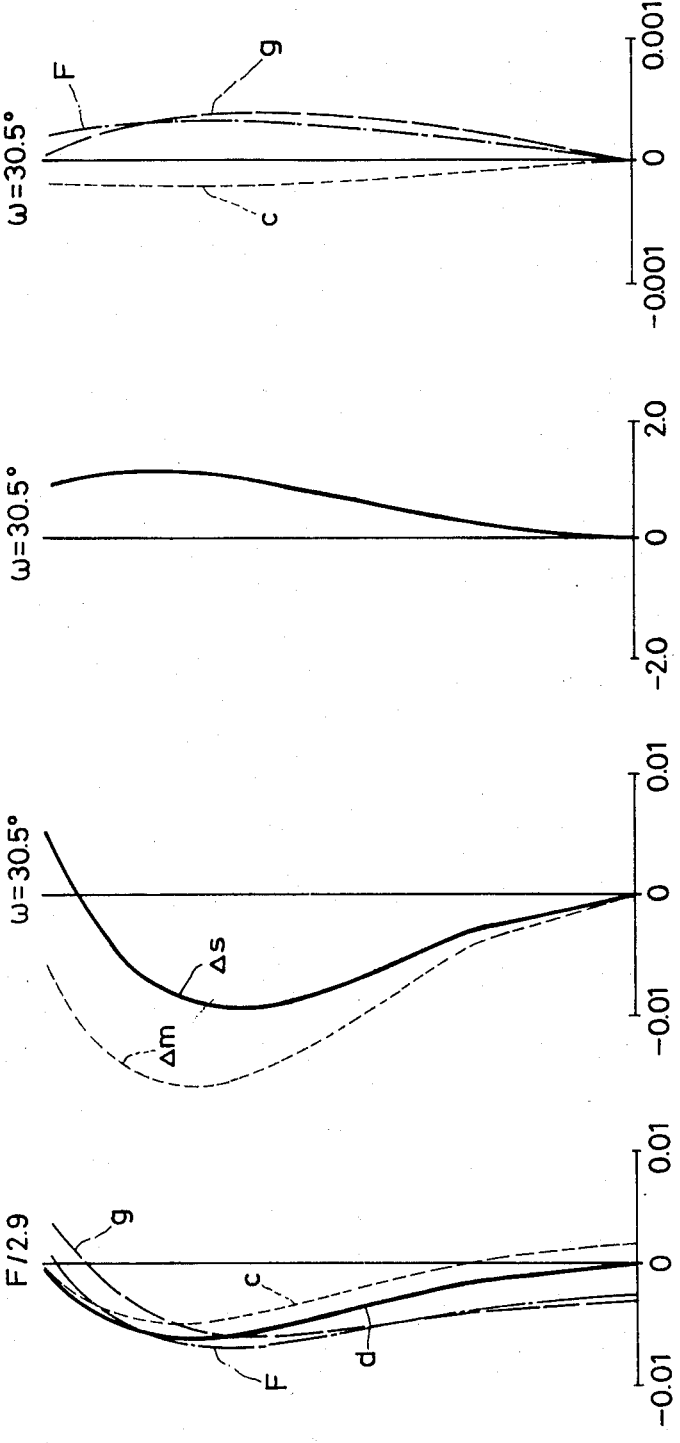

BEHIND-STOP TESSER TYPE LENS SYSTEM

BACKGROUND OF THE INVENTION (a) Field of the Invention

The present invention relates to a behind-stop Tesser type lens system.

(b) Description of the Prior Art

Generally, in a Tesser type lens system, the object-side surface of the second lens component has such a shape as to be concave to the object-side in order to correct the spherical aberration generated in the first lens component. Therefore, the incident angle of the offaxial light to this surface will be large and will tend to generate a high-order aberration at the marginal part of the angular field of view. Specially, in the behind-stop type, as the offaxial rays pass the position largely apart from the optical axis compared with the between-stop type, this inclination will be stronger and the curvature of field and a comatic flare will be remarkable.

In order to eliminate this kind of unfavorableness concerning to the aberrations and to maintain a favorable image forming ability, such a method as to make longer the whole length of a lens system was conventionally adopted. Therefore, it was difficult to realize the compactness of a lens system. For example, the lens system disclosed in Japanese laid-open Patent Application No. 22630/75 has such a telephoto ratio as 1.16.

SUMMARY OF THE INVENTION

A primary object of the present invention is to provide a behind-stop Tesser type lens system more compact and favorable in the image forming ability.

BRIEF DESCRIPTION OF THE DRAWINGS

FIGS. 2A, 2B, 2C and 2D are diagrams respectively showing the aberrations of an embodiment of the lens system according to the present invention; and FIGS. 3A, 3B, 3C and 3D are diagrams respectively showing the aberrations of another embodiment of the lens system according to the present invention.

DETAILED DESCRIPTION OF THE PREFERRED EMBODIMENTS

Figure 1:
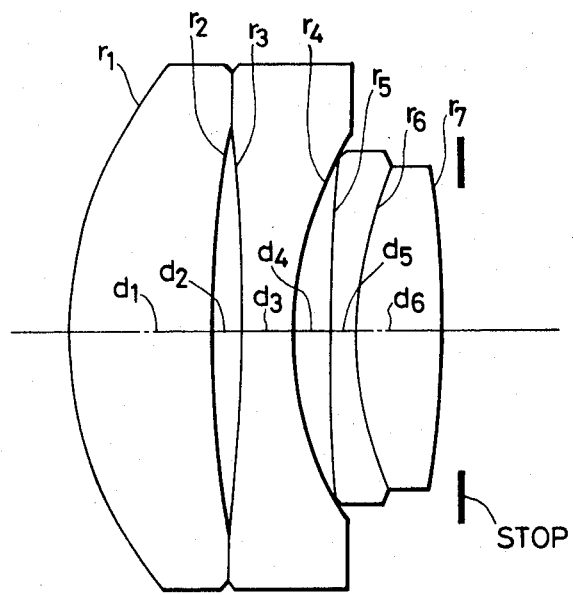
FIG. 1 is a sectional view of the behind-stop Tesser type lens system according to the present invention.

The behind-stop Tesser type lens system of the present invention is formed with a first lens component of a positive meniscus lens of which a convex surface is faced to the object-side, a second lens component of a biconcave lens and a third lens component of a positive cemented doublet comprising a negative meniscus lens and a biconvex lens, which are so arranged in order from the object-side as is shown in FIG. 1, and characterized in having the following numerical data.

Embodiment I $f = 1$, $F/2.9$, $2\omega = 61°$
$r_1 = 0.3546$
$\quad d_1 = 0.1354$, $n_1 = 1.77250$, $\nu_1 = 49.66$
$r_2 = 0.9671$
$\quad d_2 = 0.0305$
$r_3 = -1.3861$
$\quad d_3 = 0.0458$, $n_2 = 1.68893$, $\nu_2 = 31.08$
$r_4 = 0.3166$
$\quad d_4 = 0.0349$
$r_5 = 1.9547$
$\quad d_5 = 0.0232$, $n_3 = 1.59270$, $\nu_3 = 35.29$
$r_6 = 0.3403$
$\quad d_6 = 0.0817$, $n_4 = 1.80610$, $\nu_4 = 40.95$
$r_7 = -0.7744$ Embodiment II $f = 1$, $F/2.9$, $2\omega = 61°$
$r_1 = 0.3593$
$\quad d_1 = 0.1333$, $n_1 = 1.7725$, $\nu_1 = 49.66$
$r_2 = 0.9947$
$\quad d_2 = 0.0305$
$r_3 = -1.3813$
$\quad d_3 = 0.0493$, $n_2 = 1.68893$, $\nu_2 = 31.08$
$r_4 = 0.3234$
$\quad d_4 = 0.0327$
$r_5 = 1.8921$
$\quad d_5 = 0.0234$, $n_3 = 1.5927$, $\nu_3 = 35.29$
$r_6 = 0.3467$
$\quad d_6 = 0.0818$, $n_4 = 1.80610$, $\nu_4 = 40.95$
$r_7 = -0.7856$ In the above, reference symbols $r_1$ through $r_7$ respectively represent radii of curvature of respective surfaces of lenses, reference symbols $d_1$ through $d_6$ respectively represent thicknesses of respective lenses and airspaces between lenses, reference symbols $n_1$ through $n_4$ respectively represent refractive indexes of respective lenses, reference symbols $\nu_1$ through $\nu_4$ respectively represent Abbe's numbers of respective lenses, the reference symbol f represents the focal length of the whole lens system, the reference symbol F/ represents F number and the reference symbol $2\omega$ represents angle of view.

In the present invention, the deterioration of the offaxial aberrations at the shortened whole length is prevented through making the incident height of the offaxial rays as small as possible by arranging the respective divergent surfaces of the first and second lens components, especially the object-side surface of the second lens component which has a greater influence on the offaxial aberrations near to the stop in order to make the telephoto ratio smaller and to control the offaxial aberrations. That is to say, according to the present invention, the offaxial aberrations are corrected through making the divergent surfaces of the first and second lens components approximate to the stop by shortening the whole length of the lens system and making the thickness of the first lens component so thick as to be about 0.133 to 0.135. As a result of it, a favorable image forming ability is secured in the present invention in spite that it is made compact by prescribing the telephoto ratio 1.12.

From FIGS. 2A through 2D representing the diagrams of aberrations of the lens system shown in Embodiment I and FIGS. 3A through 3D representing the diagrams of aberrations of the lens system shown in Embodiment II, it is apparent that the aberrations are favorably corrected in both Embodiments.

I claim:

1. A behind-stop Tesser type lens system comprising a first lens component being a positive meniscus lens with its convex surface faced to the object-side, a second lens component being a biconcave lens and a third lens component being a cemented doublet lens comprising a negative meniscus lens and a biconvex lens and characterized in having the following numerical data:

| | f = 1 | | |
|---|---|---|---|
| $r_1 = 0.3546$ | | | |
| | $d_1 = 0.1354$ | $n_1 = 1.77250$ | $\nu_1 = 49.66$ |
| $r_2 = 0.9671$ | | | |
| | $d_2 = 0.0305$ | | |
| $r_3 = -1.3861$ | | | |
| | $d_3 = 0.0458$ | $n_2 = 1.68893$ | $\nu_2 = 31.08$ |
| $r_4 = 0.3166$ | | | |
| | $d_4 = 0.0349$ | | |
| $r_5 = 1.9547$ | | | |
| | $d_5 = 0.0232$ | $n_3 = 1.59270$ | $\nu_3 = 35.29$ |
| $r_6 = 0.3403$ | | | |
| | $d_6 = 0.0817$ | $n_4 = 1.80610$ | $\nu_4 = 40.95$ |
| $r_7 = -0.7744$ | | | |

In the above, reference symbols $r_1$ through $r_7$ respectively represent radii of curvature of respective surfaces of lenses, reference symbols $d_1$ through $d_6$ respectively represent thicknesses of respective lenses and airspaces between lenses, reference symbols $n_1$ through $n_4$ respectively represent refractive indexes of respective lenses, and reference symbols $\nu_1$ through $\nu_4$ respectively represent Abbe's numbers of respective lenses.

2. A behind-stop Tesser type lens system comprising a first lens component being a positive meniscus lens with its convex surface faced to the object-side, a second lens component being a biconcave lens and a third lens component being a positive cemented doublet lens comprising a negative meniscus lens and a biconvex lens and characterized in having the following numerical data:

| | f = 1 | | |
|---|---|---|---|
| $r_1 =$ | 0.3593 | | |
| | $d_1 = 0.1333$ | $n_1 = 1.7725$ | $\nu_1 = 49.66$ |
| $r_2 =$ | 0.9947 | | |
| | $d_2 = 0.0305$ | | |
| $r_3 =$ | $-1.3813$ | | |
| | $d_3 = 0.0493$ | $n_2 = 1.68893$ | $\nu_2 = 31.08$ |
| $r_4 =$ | 0.3234 | | |
| | $d_4 = 0.0327$ | | |
| $r_5 =$ | 1.8921 | | |
| | $d_5 = 0.0234$ | $n_3 = 1.5927$ | $\nu_3 = 35.29$ |
| $r_6 =$ | 0.3467 | | |
| | $d_6 = 0.0818$ | $n_4 = 1.80610$ | $\nu_4 = 40.95$ |
| $r_7 =$ | $-0.7856$ | | |

In the above, reference symbols $r_1$ through $r_7$ respectively represent radii of curvature of respective surfaces of lenses, reference symbols $d_1$ through $d_6$ respectively represent thicknesses of respective lenses and airspaces between lenses, reference symbols $n_1$ through $n_4$ respectively represent refractive indexes of respective lenses, and reference symbols $\nu_1$ through $\nu_4$ respectively represent Abbe's numbers of respective lenses.

* * * * *